(12) United States Patent
Dudar et al.

(10) Patent No.: US 9,448,098 B2
(45) Date of Patent: Sep. 20, 2016

(54) FUEL LEVEL INFERENCE FROM CANISTER TEMPERATURES

(71) Applicant: Ford Global Technologies, LLC, Dearborn, MI (US)

(72) Inventors: Aed M. Dudar, Canton, MI (US); Mark Daniel Bunge, Dearborn, MI (US); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 492 days.

(21) Appl. No.: 13/910,793

(22) Filed: Jun. 5, 2013

(65) Prior Publication Data

US 2014/0360260 A1    Dec. 11, 2014

(51) Int. Cl.
| | | |
|---|---|---|
| *G01F 23/00* | (2006.01) | |
| *G01F 23/22* | (2006.01) | |
| *G01F 1/68* | (2006.01) | |
| *B60K 35/00* | (2006.01) | |
| *B60W 10/00* | (2006.01) | |
| *F02D 1/00* | (2006.01) | |
| *G01F 22/00* | (2006.01) | |
| *G07C 5/00* | (2006.01) | |

(Continued)

(52) U.S. Cl.
CPC ......... *G01F 23/22* (2013.01); *B60K 15/03177* (2013.01); *B60K 15/03504* (2013.01); *B60K 35/00* (2013.01); *B60W 10/00* (2013.01); *F02D 1/00* (2013.01); *F02M 25/08* (2013.01); *F02M 25/0854* (2013.01); *F02M 25/0872* (2013.01); *F17C 11/00* (2013.01); *G01F 1/68* (2013.01); *G01F 22/00* (2013.01); *G07C 5/00* (2013.01); *B60K 2015/0321* (2013.01); *B60K 2015/03203* (2013.01); *B60K 2015/03217* (2013.01); *B60K 2015/03514* (2013.01); *B60W 2560/02* (2013.01); *G01F 23/32* (2013.01)

(58) Field of Classification Search
CPC ...... G01F 23/00; G01F 23/284; G01F 23/22; G01F 22/00; G01F 5/00; B60K 15/03177
USPC ...................................................... 73/290 R
See application file for complete search history.

(56) References Cited

U.S. PATENT DOCUMENTS

| 5,113,834 A * | 5/1992 | Aramaki ............ F02M 25/0809 123/198 D |
| 2007/0277788 A1* | 12/2007 | Egawa ...................... B01J 20/20 123/519 |

(Continued)

FOREIGN PATENT DOCUMENTS

| JP | H07317612 A | 12/1995 |
| WO | 2004083619 A1 | 9/2004 |

OTHER PUBLICATIONS

Anonymous, "Utilizing Exponential Decay Cooling Curves to Predict Liquid Fuel Temperature Stabilization After Key Off," IPCOM No. IPCOM000238396D, Published Aug. 22, 2014, 3 pages.

(Continued)

*Primary Examiner* — Hezron E Williams
*Assistant Examiner* — Rodney T Frank
(74) *Attorney, Agent, or Firm* — James Dottavio; Alleman Hall McCoy Russell & Tuttle LLP

(57) ABSTRACT

Methods and systems for inferring a fuel level in a fuel tank based on temperature changes in a carbon canister are disclosed. In one example approach a method comprises, indicating a fuel level in a fuel tank based on a temperature change of adsorbent in a carbon canister during refueling.

11 Claims, 10 Drawing Sheets

(51) Int. Cl.
*F02M 25/08* (2006.01)
*B60K 15/035* (2006.01)
*F17C 11/00* (2006.01)
*G01F 23/32* (2006.01)
*B60K 15/03* (2006.01)

(56) References Cited

U.S. PATENT DOCUMENTS

2010/0101311 A1* 4/2010 Nakano ............ F02M 25/0854
73/114.39
2011/0168140 A1* 7/2011 DeBastos ........... F02M 25/0818
123/521
2014/0026865 A1* 1/2014 Dudar ................. F02M 37/106
123/518
2014/0352796 A1* 12/2014 Dudar ................. B60K 15/035
137/15.01

OTHER PUBLICATIONS

Anonymous, "Fuel Level Indication Correction As a Function of Fuel Tank Pressure, Temperature and Time," IPCOM No. 000234612, Published Jan. 22, 2014, 5 pages.

* cited by examiner

FUEL LEVEL INFERENCE FROM CANISTER TEMPERATURES

BACKGROUND/SUMMARY

To reduce discharge of fuel vapors into the atmosphere, motor vehicles induct fuel vapors from a fuel tank into the engine. An evaporative emission control system including a carbon canister is also coupled to the fuel tank to adsorb fuel vapors under some conditions. For example, the carbon canister may adsorb refueling, diurnal and running loss vapors. The carbon canister, however, has limited capacity, thus engine running manifold vacuum may be used to desorb the vapor from the carbon canister via opening of a purge valve. Desorbed vapors are combusted in engine.

Fuel tanks in such vehicles may include a fuel level sensor within the fuel tank for determining an amount of fuel in the fuel tank so that, for example, an operator of the vehicle may be alerted to refuel the vehicle when the fuel level is low, e.g., below a threshold value. For example, during refueling, the fuel level sensor may be used to determine how much fuel was added to the fuel tank so that indications of fuel level may be adjusted accordingly.

However, the inventors herein have recognized that fuel level sensors in the fuel tank may be inaccurate during certain conditions, e.g., when a vehicle is parked on an uneven surface or on an incline. Further, fuel level sensors in a fuel tank may become degraded over time so that such sensors provide unreliable or inaccurate indications of fuel level. Thus, the inventors herein have recognized that it may be desirable to provide a secondary or backup fuel level sensing approach to infer fuel amount in the tank.

Further, the inventors herein have recognized that during a refueling event an exothermic reaction associated with vapor adsorption in the canister takes place leading to an increase of temperature in the canister. As more fuel is dispensed into the fuel tank, portions of the canister may become saturated so that the vapor flowing through the canister cools the adsorbent in the canister leading to a decrease in temperature in the canister. Further, at the end of refueling, vapor diffusion from downstream portions of the adsorbent in the canister causes a heating effect wherein the temperature again increases in the canister. The inventors have recognized that such temperature changes in the canister may be used to infer a fuel level of the tank. This fuel level may be adjusted to obtain a current fuel level by taking into account how much fuel is injected into the engine during engine operation to that the amount of fuel in the tank may be tracked and indicated accurately.

In one example approach, a method for an engine with an evaporative emission control system comprises, indicating a fuel level in a fuel tank based on a temperature change of adsorbent in a carbon canister during refueling. In some examples, the temperature change may be based on a cool down duration based on a single temperature sensor coupled to the canister. In other examples, the temperature change may be based on a plurality of temperature sensors coupled to the carbon canister at various depths.

In this way, a secondary source for fuel level indication, instead of or in addition to a fuel level sensor in the fuel tank, may be provided to accurately determine fuel levels in a fuel tank by inferring a fuel level based on temperature changes in the canister. Such an approach, may increase accuracy of fuel level determination and reduce errors associated with fuel level sensors inside the fuel tank. Further, in some examples, a single temperature sensor in the canister may be used to monitor temperature changes to infer fuel level which may lead to increased fuel level accuracy with minimal additional costs.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
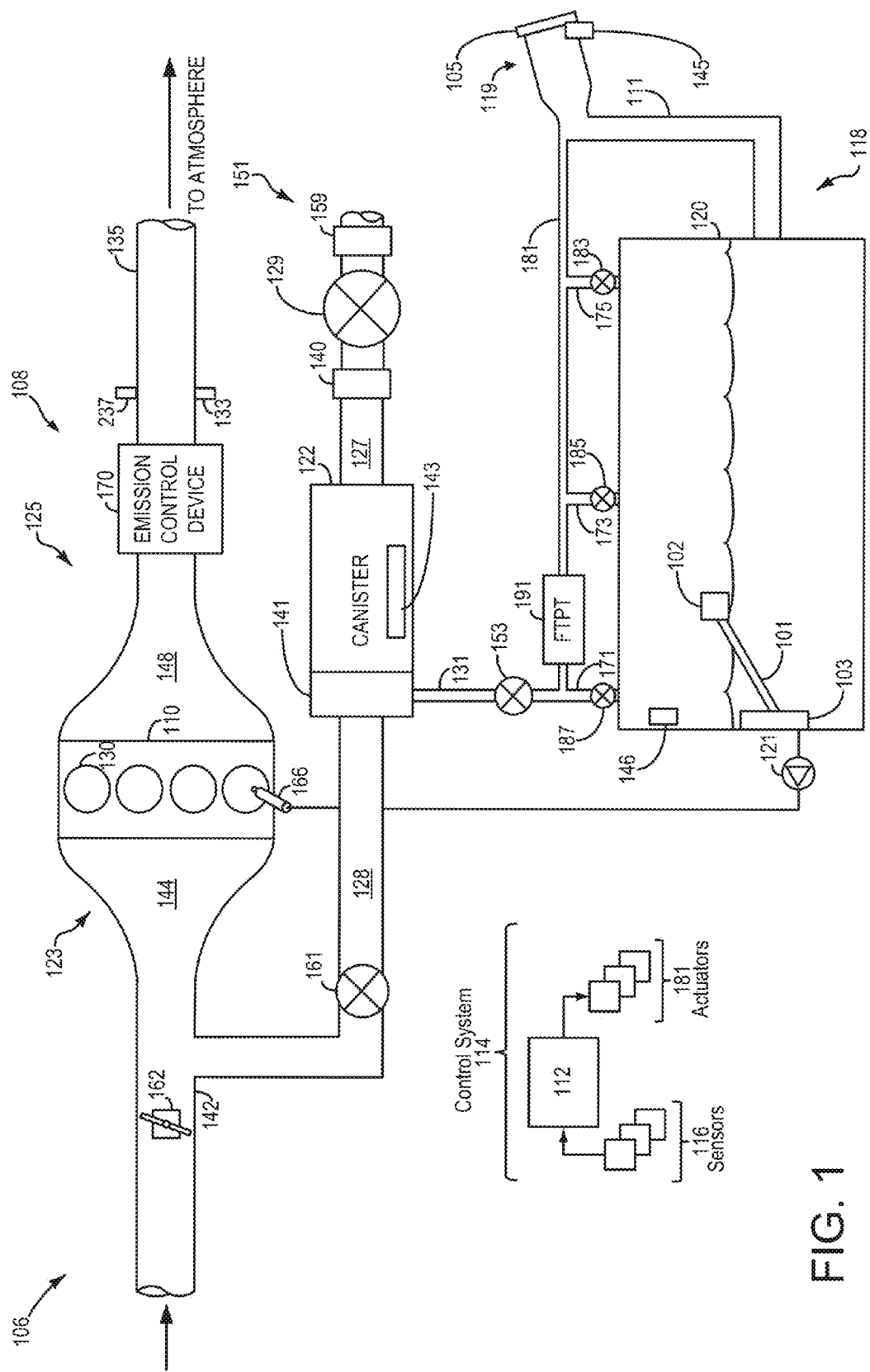
FIG. 1 shows an example vehicle system with a fuel system and an evaporative emission control system.
Figure 2:
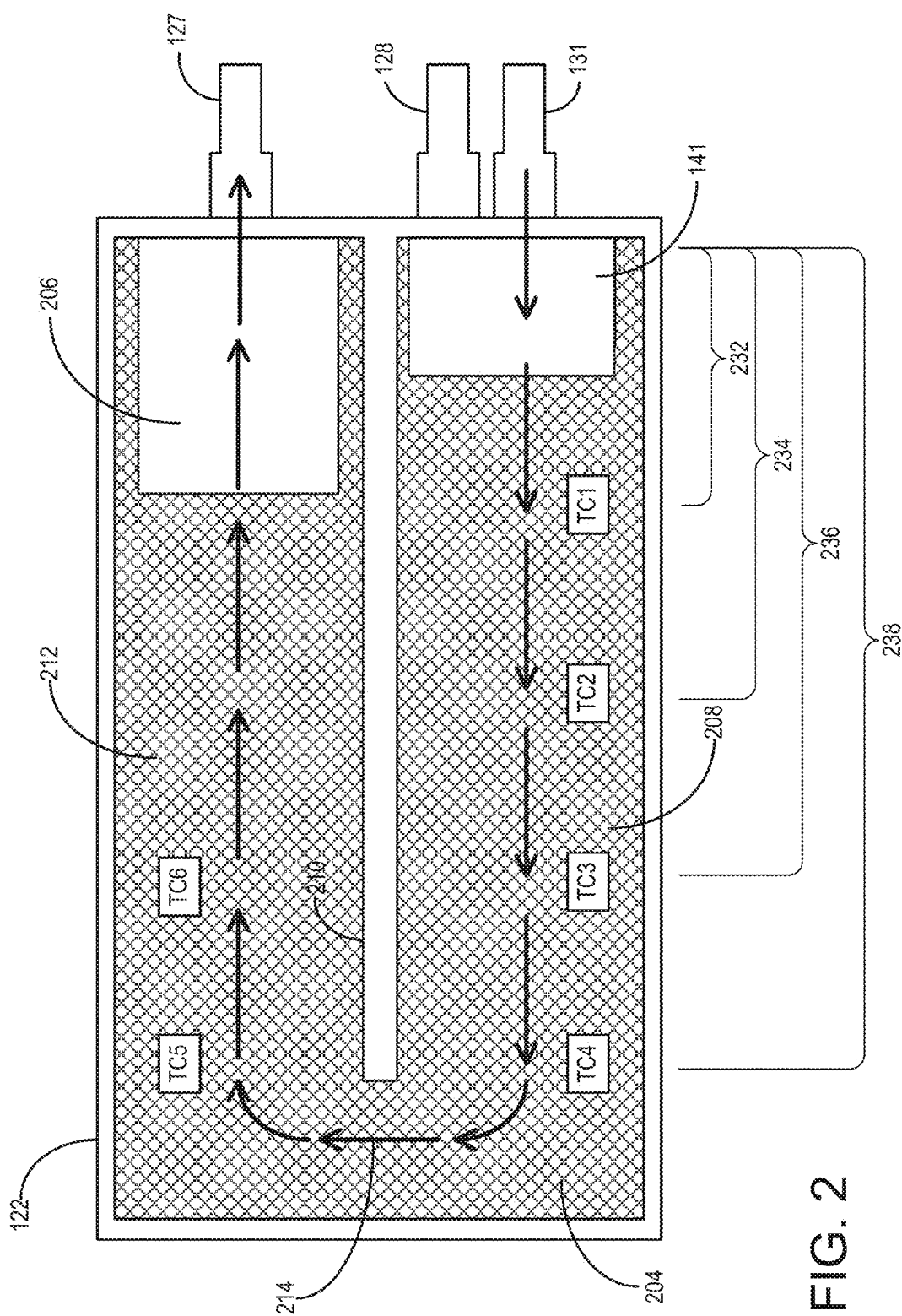
FIG. 2 shows an example carbon canister including one or more temperature sensors used to infer a fuel level in a fuel tank.
Figure 4:
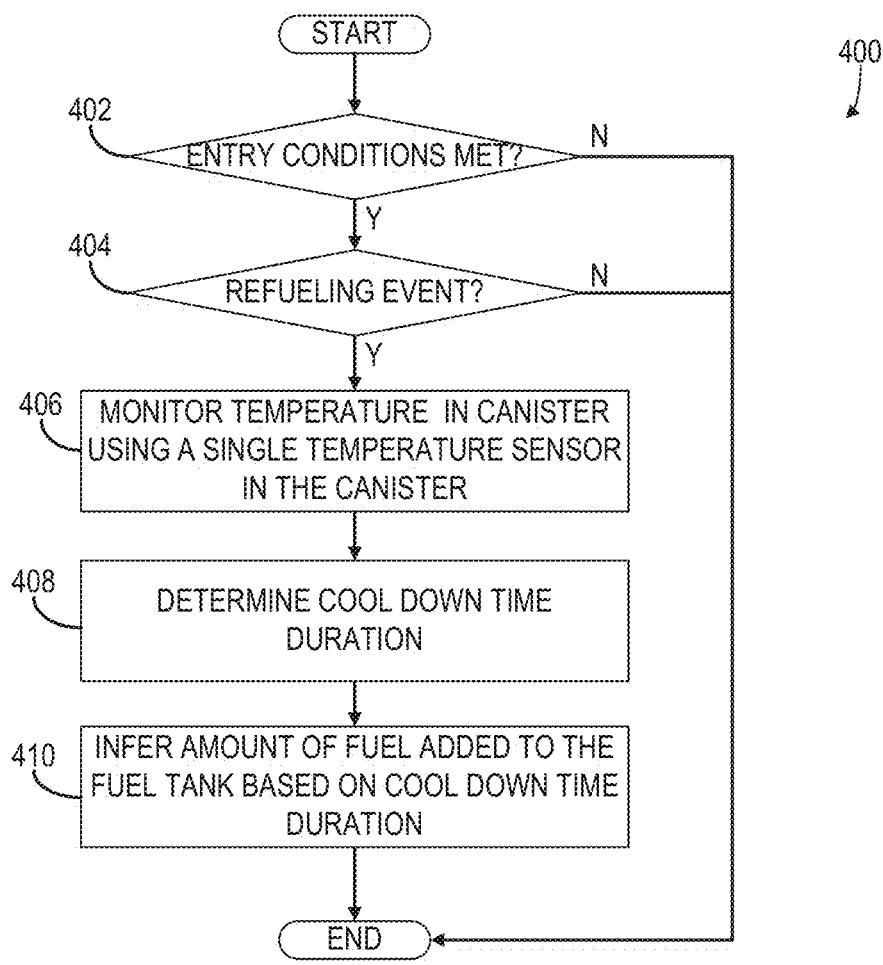
FIG. 4 shows an example method for inferring a fuel level in a fuel tank using a single temperature sensor in a carbon canister.
Figure 5:
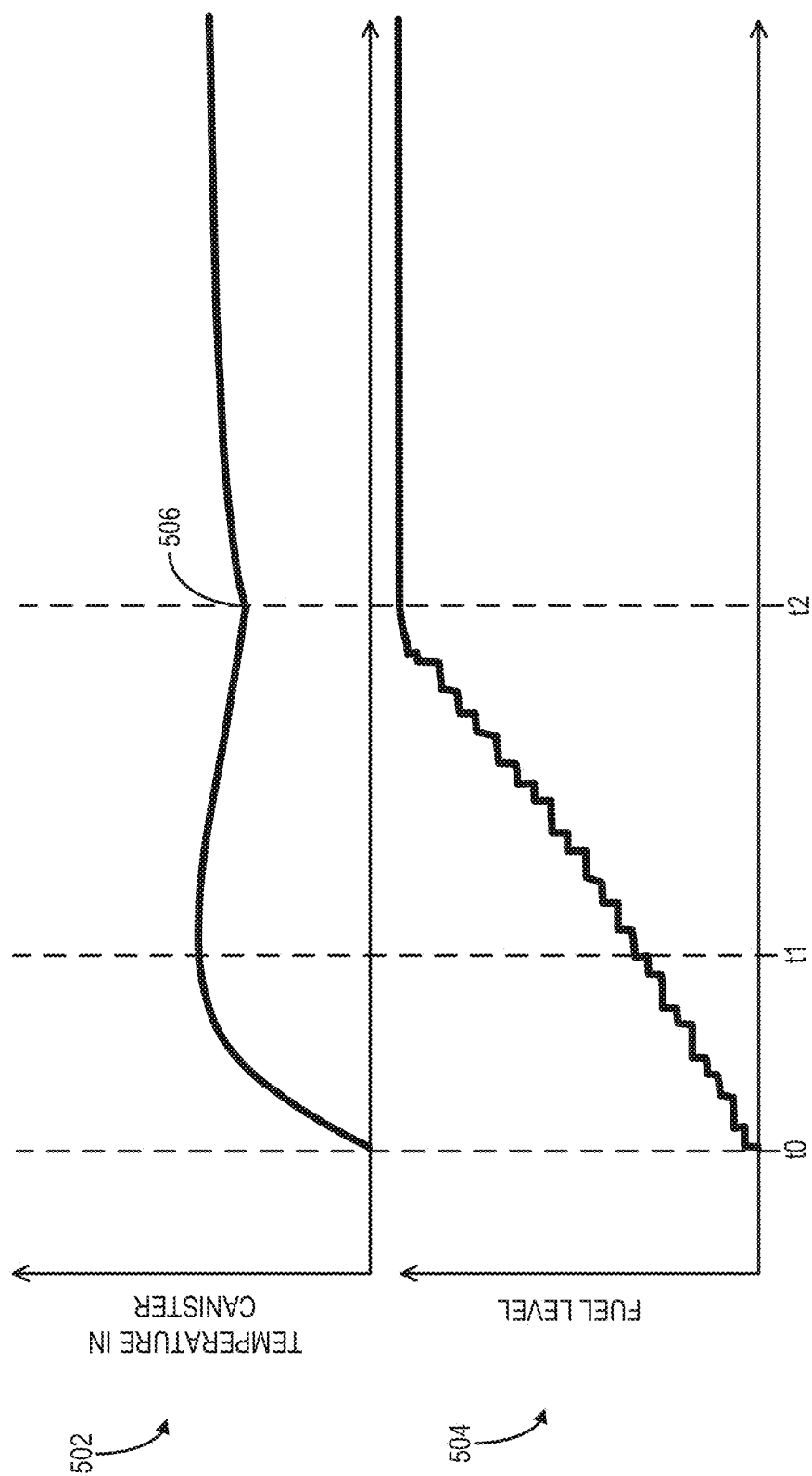
FIG. 5 illustrates an example temperature change based on a single temperature sensor in a carbon canister used to infer a fuel level in a fuel tank.
Figure 6:
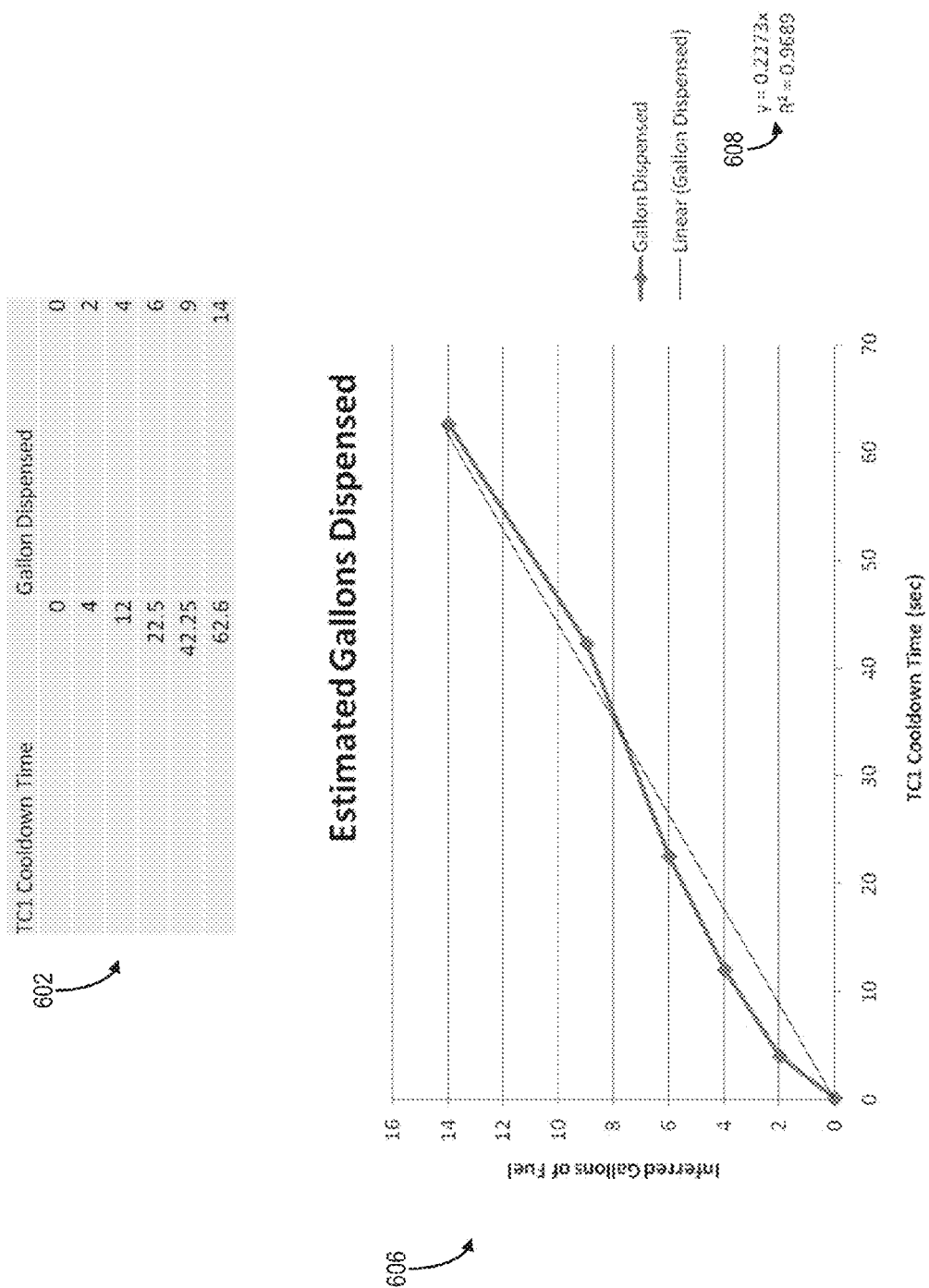
FIG. 6 shows an example graph and corresponding data illustrating a relationship between a temperature cool down duration in a carbon canister and an amount of fuel added to a fuel tank during refueling.

The following description relates to systems and methods for inferring a fuel level in a fuel tank based on temperature changes in a carbon canister included in an evaporative emission control system in a vehicle, such as the example vehicle shown in FIG. 1. As shown in FIG. 2, a carbon canister may include one or more temperature sensors disposed at various locations within the canister for monitoring temperature changes in the canister during a refueling event when fuel is replenished in the fuel tank. During a refueling event, the fuel tank is vented to the atmosphere through the carbon canister so that fuel vapors are adsorbed in an adsorbent, e.g., activated carbon, in the canister. As shown in the flow diagram of FIG. 3, temperature changes in the canister due to vapor adsorption and vapor diffusion in the canister may be used to infer a fuel level in the fuel tank, e.g., an amount of fuel added to the fuel tank during the refueling event. The amount of fuel injected into the engine during engine operation may be used together with this inferred fuel level to accurately indicate an amount of fuel contained in the fuel tank so that a vehicle operator may be alerted to refuel the vehicle when the fuel level is low, e.g., below a threshold value. In some examples, as illustrated in FIGS. 4-6, a single temperature sensor in a carbon canister may be used to determine a temperature cool down duration during a refueling event from which a fuel level inference may be based. In other examples, as illustrated in FIGS. 7-10, a plurality of temperature sensors included in a carbon canister at different depths may be used to determine a time duration from an initial temperature increase in the canister to a temperature inflection point from which a fuel level inference may be based.

Turning now to the figures, FIG. 1 shows an example vehicle system 106 with a fuel system 118 and an evaporative emission control system 151. The vehicle system 106 includes an engine system 108 coupled to an emissions control system 151 and a fuel system 118. Emission control system 151 includes a fuel vapor container or canister 122 which may be used to capture and store fuel vapors. In some examples, vehicle system 106 may be a hybrid vehicle system, e.g., a hybrid-electric vehicle (HEV) or a plug-in hybrid-electric vehicle (PHEV). However, in other examples, vehicle system 106 may not be a hybrid vehicle system and may be propelled via the engine system 108 only.

The engine system 108 may include an engine 110 having a plurality of cylinders 130. The engine 110 includes an engine intake 123 and an engine exhaust 125. The engine intake 123 includes a throttle 162 fluidly coupled to the engine intake manifold 144 via an intake passage 142. The engine exhaust 125 includes an exhaust manifold 148 leading to an exhaust passage 135 that routes exhaust gas to the atmosphere. The engine exhaust 125 may include one or more emission control devices 170, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 118 may include a fuel tank 120 coupled to a fuel pump system 121. The fuel pump system 121 may include one or more pumps for pressurizing fuel delivered to the injectors of engine 110, such as the example injector 166 shown. While only a single injector 166 is shown, additional injectors are provided for each cylinder. It will be appreciated that fuel system 118 may be a return-less fuel system, a return fuel system, or various other types of fuel system. Fuel tank 120 may include a temperature sensor 146 disposed therein.

A fuel level sensor 103 may be included in fuel tank 120 to determine an amount of fuel in the fuel tank. For example, fuel level sensor 103 may include an arm 101 coupled to a float 102. In this example, the position of the float 102 on the top surface of the fuel volume may be used to determine a fuel level in the fuel tank. However, as remarked above, during some conditions, such a fuel level sensor may provide inaccurate fuel level readings, e.g., when a vehicle is positioned at an incline so that the top surface of the fuel volume is not level. Further, fuel level sensors in a fuel tank may become degraded over time so that such sensors provide unreliable or inaccurate indications of fuel level. Thus, it may be desirable to provide a secondary or backup fuel level sensing approach based on temperatures in a fuel vapor canister to infer fuel amount in the tank. Examples, of estimating fuel levels in a fuel tank based on temperatures in a canister are described below.

Vapors generated in fuel system 118 may be routed to an evaporative emissions control system 151 which includes a fuel vapor canister 122 via vapor recovery line 131, before being purged to the engine intake 123. Fuel vapor canister 122 may include a buffer or load port 141 to which fuel vapor recovery line 131 is coupled. Further, one or more temperature sensors 143 may be included in fuel vapor canister 122 so that temperature changes in the fuel vapor canister may be monitored to infer fuel levels in the fuel tank as described below. The one or more temperature sensors 143 may be located within canister 122 at any suitable locations. For example, canister 122 may include a temperature sensor adjacent to load port 141 and/or at various depths within the adsorbent in the canister. An example, canister including one or more temperature sensors is shown in FIG. 2 described below.

Fuel vapors undergo an exothermic reaction when carbon in the canister adsorbs vapor from the fuel tank thus temperatures of the fuel vapor canister, e.g., as determined by the one or more temperature sensors 143, may increase when vapors dispensed by a refueling pump enter the canister and get adsorbed into activated charcoal in the canister. During a refueling event the exothermic reaction associated with vapor adsorption in the canister takes place leads to an increase of temperature in the canister; however, as more fuel is dispensed into the fuel tank, portions of the canister may become saturated so that the vapor flowing through the canister cools the adsorbent in the canister leading to a decrease in temperature in the canister. At the end of refueling, vapor diffusion from downstream portions of the adsorbent in the canister may cause a heating effect wherein the temperature again increases in the canister. Thus, as described in more detail below, these temperature changes in the canister may be used to infer a fuel level of the tank. Further, this inferred fuel level may be adjusted to obtain a current fuel level by taking into account how much fuel is injected into the engine during engine operation to that the amount of fuel in the tank may be tracked and indicated accurately.

Vapor recovery line 131 may be coupled to fuel tank 120 via one or more conduits and may include one or more valves for isolating the fuel tank during certain conditions. For example, vapor recovery line 131 may be coupled to fuel tank 120 via one or more or a combination of conduits 171, 173, and 175. Further, in some examples, one or more fuel tank isolation valves may be included in recovery line 131 or in conduits 171, 173, or 175. Among other functions, fuel tank isolation valves may allow a fuel vapor canister of the emissions control system to be maintained at a low pressure or vacuum without increasing the fuel evaporation rate from the tank (which would otherwise occur if the fuel tank pressure were lowered). For example, conduit 171 may include a grade vent valve (GVV) 187, conduit 173 may include a fill limit venting valve (FLVV) 185, and conduit 175 may include a grade vent valve (GVV) 183, and/or conduit 131 may include an isolation valve 153. Further, in some examples, recovery line 131 may be coupled to a fuel filler system 119. In some examples, fuel filler system may include a fuel cap 105 for sealing off the fuel filler system from the atmosphere. Refueling system 119 is coupled to fuel tank 120 via a fuel filler pipe or neck 111. Further, a fuel cap locking mechanism 145 may be coupled to fuel cap 105. The fuel cap locking mechanism may be configured to automatically lock the fuel cap in a closed position so that the fuel cap cannot be opened. For example, the fuel cap 105 may remain locked via locking mechanism 145 while pressure or vacuum in the fuel tank is greater than a threshold. In response to an identification of a refueling event, the fuel tank may be depressurized and the fuel cap unlocked after the pressure or vacuum in the fuel tank falls below a threshold.

A fuel tank pressure transducer (FTPT) 191, or fuel tank pressure sensor, may be included between the fuel tank 120 and fuel vapor canister 122, to provide an estimate of a fuel tank pressure. The fuel tank pressure transducer may alternately be located in vapor recovery line 131, purge line 128, vent line 127, or other location within emission control system 151 without affecting its engine-off leak detection ability. As another example, one or more fuel tank pressure sensors may be located within fuel tank 120.

Emissions control system 151 may include one or more emissions control devices, such as one or more fuel vapor canisters, e.g., fuel vapor canister 122, filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 151 may further include a canister ventilation path or vent line 127 which may route gases out of the canister 122 to the atmosphere when storing, or trapping, fuel vapors from fuel system 118.

Vent line 127 may also allow fresh air to be drawn into canister 122 when purging stored fuel vapors from fuel system 118 to engine intake 123 via purge line 128 and purge valve 161. For example, purge valve 161 may be normally closed but may be opened during certain conditions so that vacuum from engine intake 144 is provided to the fuel vapor canister for purging. In some examples, vent line 127 may include an air filter 159 disposed therein upstream of a canister 122.

Flow of air and vapors between canister 122 and the atmosphere may be regulated by a canister vent valve 129. Canister vent valve may be a normally open valve so that one or more fuel tank isolation valves, e.g., valves 187, 185, 183 or 153 may be used to control venting of fuel tank 120 with the atmosphere. For example, in hybrid vehicle applications, a fuel tank isolation valve may be a normally closed valve so that by opening the isolation valve, fuel tank 120 may be vented to the atmosphere and by closing the isolation valve, fuel tank 120 may be sealed from the atmosphere. In some examples, a fuel tank isolation valve may be actuated by a solenoid so that, in response to a current supplied to the solenoid, the valve will open. For example, in hybrid vehicle applications, the fuel tank 120 may be sealed off from the atmosphere in order to contain diurnal vapors inside the tank since the engine run time is not guaranteed. Thus, for example, a fuel tank isolation valve may be a normally closed valve which is opened in response to certain conditions. For example, a fuel tank isolation valve may be commanded open following a detection of a refueling event so that the fuel tank is depressurized for refueling.

The vehicle system 106 may further include a control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 137 located upstream of the emission control device, the one or more temperature sensors 143, pressure sensor 191, fuel tank temperature sensor 146, and fuel level sensor 103. Other sensors such as pressure, temperature, air/fuel ratio, and composition sensors may be coupled to various locations in the vehicle system 106. As another example, the actuators may include fuel injector 166, throttle 162, valves 153, 187, 185, 183, and pump 140. The control system 114 may include a controller 112. The controller may receive input data from the various sensors, process the input data, and trigger the actuators in response to the processed input data based on instruction or code programmed therein corresponding to one or more routines. Example control routines are described herein with regard to FIGS. 3, 4, and 7.

FIG. 2 shows an example carbon canister 122 including one or more temperature sensors used to infer a fuel level in a fuel tank. Canister 122 includes an adsorbent 204, e.g., activated charcoal, which is used to adsorb fuel vapors from the fuel tank. For example, canister 122 may be coupled to fuel tank 120 via vapor recovery line 131. Canister 122 may be put in communication with the atmosphere via vent line 127. Purge line 128 couples the canister to an intake 123 of the engine for purging fuel vapor stored in the canister as described above. In some examples, canister 122 may include a dividing element 210 which divides the interior of the canister into a first chamber 208 and a second chamber 212. The first chamber 208 and the second chamber 212 are coupled together so that vapors vented from the fuel tank 120 via vapor recovery line 131 travel through the canister from the vapor recovery line 131 through first chamber 208 and then through second chamber 212 toward the vent 127 along a direction indicated by arrows 214. The arrows 214 illustrate a vapor path through the adsorbent 204 in the canister from the vapor recovery line 131 towards the vent line 127 so that vapor recovery line 131 is positioned upstream of the vapor flow and vent line 127 is positioned downstream of the vapor flow. It should be understood that, though FIG. 2 shows a dividing element 210 used to create a vapor flow path through the canister, in other examples canister 122 may not include a dividing element or may include any suitable features to create a vapor flow path from recovery line 131 toward vent line 127.

In some examples, canister 122 may only include a single temperature sensor or thermocouple used to infer fuel levels in fuel tank 120 as described below. For example, canister 122 may only include temperature sensor TC1 and may not include any other temperature sensors. During a refueling event, temperatures in the canister may initially rise due to an exothermic reaction associated with vapor adsorption. However, as more fuel is dispensed into the fuel tank, portions of the canister may become saturated so that the vapor flowing through the canister cools the adsorbent in the canister leading to an initial decrease in temperature in the canister. At the end of refueling, vapor diffusion from downstream portions of the adsorbent in the canister may cause the temperature to again increase in the canister at a temperature inflection point. In this example, the single temperature sensor, e.g., TC1, may be used to determine a cool down duration from the initial temperature decrease to the inflection point where the temperature in the canister switches from decreasing to increasing. As described below, this cool down duration may be used to infer an amount of fuel added to the fuel tank during the refueling event.

In other examples, canister 122 may include a plurality of temperature sensors at different depths within the canister. For example, canister 122 may include temperature sensors or thermocouples TC1, TC2, TC3, TC4, TC5, and TC6 at different points within canister 122 along the vapor path indicated by arrows 214. It should be understood that, though FIG. 2 shows six temperature sensors in the canister, any number of temperatures sensors may be includes in the canister at any suitable locations. For example, a first temperature sensor TC1 may be included at a first distance 232 from vapor recovery line 131 within canister 122, a second temperature sensor TC2 may be included at a second distance 234 greater than first distance 232 from vapor recovery line 131 within canister 122, a third temperature sensor TC3 may be included at a third distance 236 greater than second distance 234 from vapor recovery line 131 within canister 122, a fourth temperature sensor TC4 may be included at a fourth distance 238 greater than third distance 236 from vapor recovery line 131 within canister 122, etc. In this example, during a refueling event, a time duration from an initial temperature increase in the first temperature sensor TC1 to a temperature inflection point as measured by the most downstream responding temperature sensor may be used to infer an amount of fuel added to the fuel tank during the refueling event. In this example, an increased amount of fuel added to the fuel tank may lead to a more downstream temperature sensor responding. The initial loading of the canister, e.g., the amount of fuel vapor stored in the canister when the refueling event begins, may affect how far downstream temperature sensors will react. In this example, by not requiring fuel level inference to be linked to a heat gain in a particular downstream temperature sensor, the initial loading of the canister may be taken into account for accurate fuel level inference.

Figure 3:
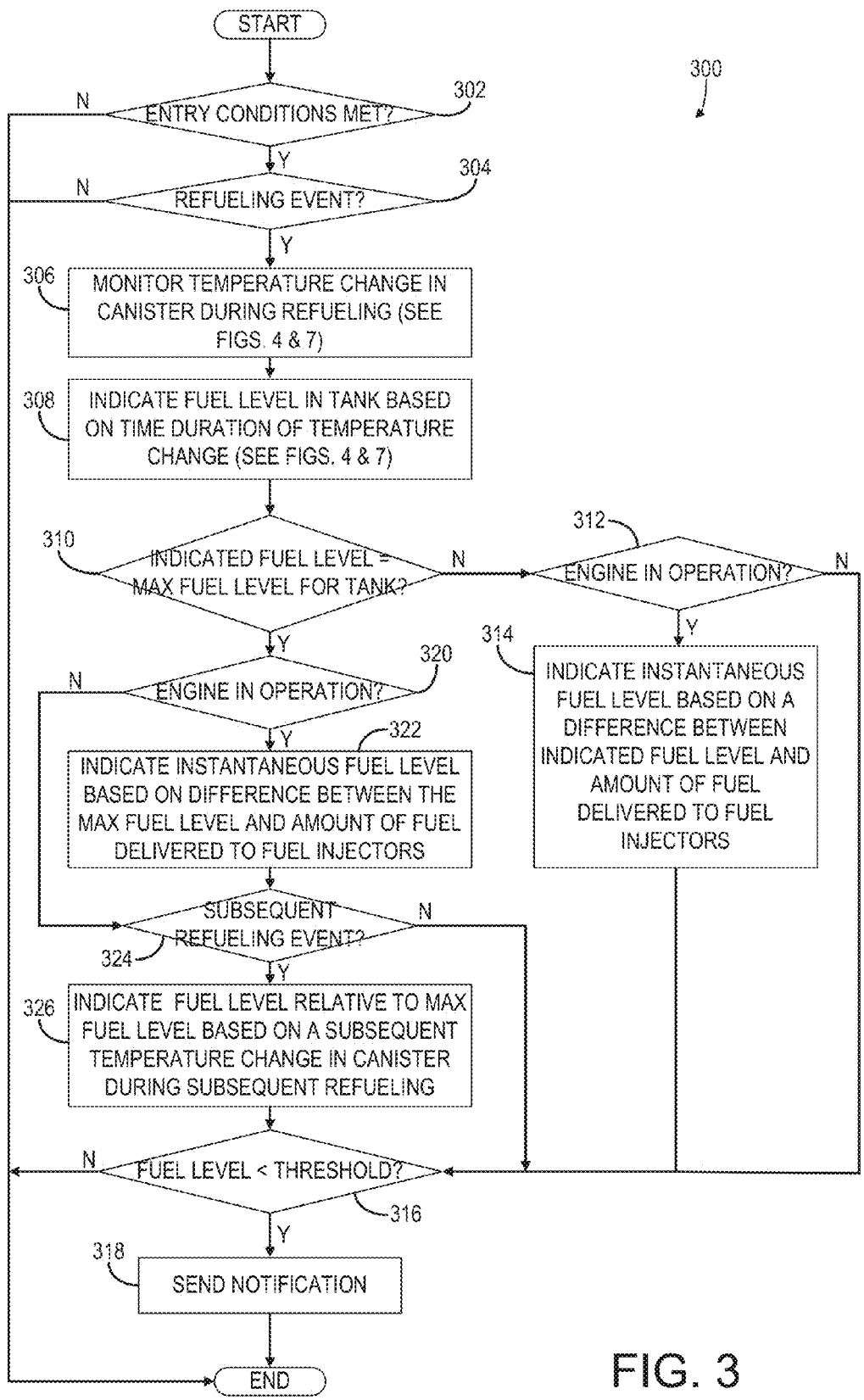
FIG. 3 shows an example method for inferring a fuel level in a fuel tank based on temperature changes in a carbon canister.

FIG. 3 shows an example method 300 for inferring a fuel level in a fuel tank included in a vehicle, e.g., the vehicle shown in FIG. 1, based on temperature changes in a carbon canister, e.g., the canister shown in FIG. 2. For example, one or more temperature sensors, e.g., one or more of temperature sensors TC1, TC2, TC3, TC4, TC5, and TC6 shown in FIG. 2, may be used to track temperature changes which occur in the canister during a refueling event in order to infer a fuel level in a fuel tank coupled to the canister, e.g., fuel tank 120.

At 302, method 300 includes determining if entry conditions are met. Entry conditions may include engine-off conditions when the engine of the vehicle is not in operation. Engine off conditions may include any condition when an engine of the vehicle is not in operation. Engine off conditions may follow a key-off event wherein the vehicle is turned off, e.g., where the vehicle is parked or is not in use and the engine is not running. For example, an engine off condition may occur when the vehicle is not moving or when the vehicle is stationary, e.g., when the vehicle is shut-down for refueling.

In some examples, entry conditions may include conditions where operation of a fuel level sensor, e.g., fuel level sensor 103, is degraded. For example, fuel level sensors in a fuel tank may become degraded over time so that such sensors provide unreliable or inaccurate indications of fuel level. As another example, fuel level sensor degradation may be detected when a vehicle is parked or positioned at an incline so that a surface of a volume of fuel in the tank is not level.

If entry conditions are met at 302, method 300 proceeds to 304. At 304, method 300 included determining if a refueling event occurs. In some examples, a refueling event may be indicated or identified in response to a predetermined temperature change in the fuel vapor canister and, in some examples, further responsive to a temperature sensor coupled to the fuel tank, e.g., to account for ambient temperature increases which may cause canister temperature to increase in the absence of a refueling event. In some examples, identification of a refueling event may be further based on a pressure sensor coupled to the fuel tank, e.g., pressure sensor 191. For example, a predetermined pressure change in the fuel tank may also be used to assist in identifying a refueling event, e.g., an increase in pressure in the fuel tank may indicate that fuel is being introduced into the fuel tank via refueling. Thus, in some examples, pressure readings of a pressure sensor in the fuel tank may be used in addition to the predetermined temperature change in the canister to determine if a refueling event is to be indicated. However, in some examples, only a predetermined temperature change in the fuel vapor canister may be used to indicate a refueling event. For example, if a pressure sensor in the fuel tank is degraded or faulty, then the predetermined temperature change in the canister may be used to determine if a refueling event is to be indicated. In other examples, a refueling event may be detected based on a sensor coupled to a fuel cap or via vehicle operator input requesting a refuel.

If a refueling event occurs at 304, method 300 proceeds to 306. At 306, method 300 includes monitoring a temperature change in the carbon canister during refueling. For example, one or more temperature sensors in the fuel vapor canister may be used to monitor temperature changes in the canister during refueling so that an amount of fuel added to the fuel tank may be inferred. As one example, as described in more detail below with regard to FIGS. 4-6, a single temperature sensor in the canister, e.g., temperature sensor TC1, may be used to monitor temperature changes in the canister during refueling. As another example, as described in more detail below with regard to FIGS. 7-10, a plurality of different temperature sensors located at different positions and depths within the canister may be used to monitor temperature changes to infer an amount of fuel added to the fuel tank during refueling.

At 308, method 300 includes indicating a fuel level in the fuel tank based on a time duration of a temperature change in the canister. For example, an amount of fuel added to the fuel tank during the refueling event may be based on a time duration of a temperature change of adsorbent in a carbon canister during the refueling event. In some examples, as described in more detail below with regard to FIGS. 4-6, the temperature change used to infer a fuel level in the fuel tank may be based on a cool down duration based on a single temperature sensor coupled to the canister. In this example, the cool down duration may be a time duration from an initial temperature decrease in the canister during refueling until an inflection point where the temperature in the canister switches from decreasing to increasing. In other examples, as described below with regard to FIGS. 7-10, the temperature change used to infer a fuel level in the fuel tank may be based on a plurality of temperature sensors coupled to the carbon canister at various depths. In this example, the temperature change may be a temperature change during a duration from an initial rise in temperature at a first temperature sensor in the canister to an inflection point in temperature at a second temperature sensor in the canister downstream of the first temperature sensor where the second temperature sensor is the most downstream temperature sensor in the canister to respond by more than a predetermined amount. Indicating a fuel level based on the temperature change in the canister may include sending an updated fuel level to a memory component included in a controller in the vehicle, e.g., control system 114, so that a fuel level display in the vehicle is updated.

At 310, method 300 includes determining if the indicated fuel level is substantially equal to a maximum fuel level for the fuel tank. For example, a fuel tank may have a predetermined maximum volume of fuel that it is capable of holding. The predetermined maximum volume of fuel that a fuel tank is capable of holding may depend on a size or other physical characteristics of the fuel tank. Before the refueling event, a residual amount of fuel may be present in the tank so that the fuel level inferred from the temperature changes in the canister is the amount of fuel added to the residual fuel present in the tank prior to refueling. The fuel level information provided by the temperature changes in the canister only provides an amount of fuel added to the tank and does not provide an indication of the amount of residual fuel in the tank at the initiation of the refueling event. Thus, the amount of fuel added to the tank may be compared to the predetermined maximum fuel level of the tank so that if the maximum amount of fuel is added to the tank during the refueling event the residual fuel level amount may be reset or calibrated to zero so that the actual amount of fuel in the tank may be tracked during subsequent engine operation and refueling events.

If the indicated fuel level is not substantially equal to a maximum fuel level for the fuel tank at 308 then the amount of residual fuel in the tank may not be known and method 300 proceeds to 312. At 312, method 300 includes determining if the engine is in operation. For example, following completion of the refueling event, the engine may be started, e.g., via a key-on event. If the engine is not in operation at 312, method 300 proceeds to 316 described below. However, if the engine is in operation at 312, method 300 proceeds to 314.

At 314, method 300 includes indicating an instantaneous fuel level based on a difference between the indicated fuel level for the fuel tank and an amount of fuel delivered to the fuel injectors. For example, the amount of fuel delivered to the cylinders during engine operation may be subtracted from the fuel level inferred from the temperature changes in the canister during the refueling event so that the amount of fuel in the fuel tank relative to the amount of fuel added to the tank during the refueling event is tracked and updated.

At 316, method 300 includes determining if the indicated fuel level is less than a threshold fuel level. The threshold fuel level may be a level of fuel at which it is desirable to alert a vehicle operator to refuel the fuel tank. If the indicated fuel level is less than the threshold level at 316, method 300 proceeds to 318 to send a notification. For example, if the fuel level falls below the threshold fuel level, then a notification may be sent to the vehicle operator to alert the operator that the fuel level is low. For example, a notification may be sent to a controller so that a fuel light is illuminated to alert the operator that the fuel level in the tank is low.

Returning to 310, if the indicated fuel level is substantially equal to the maximum fuel level for the fuel tank, then the amount of residual fuel in the tank may be set to zero so that an actual amount of fuel in the tank may be tracked and updated during subsequent engine operation and refueling. Thus, method 300 proceeds to 320.

At 320, method 300 includes determining if the engine is in operation. If the engine is not in operation at 320, method 300 proceeds to 324 described below. However, if the engine is in operation at 320, method 300 proceeds to 322. At 322, method 300 includes indicating an instantaneous fuel level based on a difference between the maximum fuel level in the fuel tank, which in this case corresponds to the amount of fuel added to the fuel tank during the refueling event as inferred from the temperature change in the canister, and an amount of fuel delivered to fuel injectors. For example, the amount of fuel delivered to the cylinders during engine operation may be subtracted after the refueling event so that the actual amount of fuel in the fuel tank is tracked and updated during engine operation and subsequent refueling events.

At 324, method 300 includes determining if a subsequent refueling event occurs. For example, since the maximum amount of fuel level was added to the tank during the refueling event, the residual fuel level in the fuel tank may be known following the refueling event and adjusted during engine operation by taking into account the amount of fuel dispensed from the tank to the fuel injectors during engine operation. Thus, during a subsequent refueling, since the residual amount of fuel is known, the amount of fuel added to the fuel tank as inferred by temperature changes in the canister during the subsequent refueling event may be added to the known residual amount of fuel in the tank so that the actual fuel level in the fuel tank is determined and updated.

If a subsequent refueling event does not occur at 324, method 300 proceeds to 316 described below. However, if a subsequent refueling event occurs at 324, method 300 proceeds to 326. At 326, method 300 includes indicating a fuel level relative to the maximum fuel level for the fuel tank based on a subsequent temperature change in the canister during the subsequent refueling event. For example, since the amount of fuel added to the fuel tank during the previous refueling event was substantially equal to the maximum fuel level of the fuel tank, then the residual fuel in the tank may be calibrated to zero so that the actual amount of fuel in the fuel tank is known following the previous refueling event. During engine operation between the refueling event and the subsequent refueling event, the amount of fuel in the fuel tank may be updated based on the maximum amount of fuel added to the tank during the refueling event and the amount of fuel delivered to the fuel injectors to obtain an updated fuel level in the tank based on the maximum fuel level in the tank. The amount of fuel added to the fuel tank during the subsequent refueling event may then be determined based on temperature changes in the canister as described above and added to the known amount of residual fuel in the tank.

At 316, method 300 includes determining if the indicated fuel level is less than a threshold fuel level. The threshold fuel level may be a level of fuel at which it is desirable to alert a vehicle operator to refuel the fuel tank. If the indicated fuel level is less than the threshold level at 316, method 300 proceeds to 318 to send a notification. For example, if the fuel level falls below the threshold fuel level, then a notification may be sent to the vehicle operator to alert the operator that the fuel level is low.

FIG. 4 shows an example method 400 for inferring a fuel level in a fuel tank using a single temperature sensor in a carbon canister, e.g., based on measurements from temperature sensor TC1 in canister 122. FIGS. 5 and 6 illustrate example method 400 and will be described concurrently with FIG. 4. Graph 502 in FIG. 5 shows temperate in the canister during a refueling event, e.g., as measured by temperature sensor TC1. Graph 504 in FIG. 5 shows fuel level in the fuel tank, e.g., tank 120, during the refueling event. FIG. 6 shows an example graph 606 and corresponding data table 602 illustrating a relationship between a temperature cool down time duration in the carbon canister and an amount of fuel added to a fuel tank during the refueling event which may be used to infer an amount of fuel added to the tank during the refueling event.

At 402, method 400 includes determining if entry conditions are met. As described above, entry conditions may include engine-off conditions and conditions where fuel level sensor operation is degraded. If entry conditions are met at 402, method 400 proceeds to 404. At 404, method 400 included determining if a refueling event occurs. If a refueling event occurs at 404, method 400 proceeds to 406.

At 406, method 400 includes monitoring temperatures in the canister using a single temperature sensor in the canister, e.g., using temperature sensor TC1 in canister 122. As remarked above, the load side of the canister may experience an immediate heat gain when refueling begins. As more fuel is dispensed, the load side region in the canister may become saturated and the vapor flowing across the load side region may cause the region to decrease in temperature or cool down. At the end of refueling, this cool down period may end when vapor diffusion from downstream portions of the adsorbent in the canister causes a heating effect.

For example, as shown in graph 502, the refueling event begins at time t0 at which point the temperature in the canister, as measured by sensor TC1, begins to increase as fuel vapor from the fuel tank is adsorbed in the canister. At time t1, the temperature as measure by sensor TC1 begins to decrease since the adsorbent adjacent to sensor TC1 becomes saturated and fuel vapor flowing across the adsorbent begins to cool down. At time t2, the temperature in the canister as measure by sensor TC1 switches from decreasing to increasing at temperature inflection point 506 since vapor diffusion from portions of the adsorbent downstream of temperature sensor TC1 causes an increase in temperature at TC1.

At 408, method 400 includes determining the cool down time duration based on the single temperature sensor coupled to the canister. The cool down duration is the time duration from the initial temperature decrease in the canister at time t1 during refueling until the inflection point 506 where the temperature in the canister switches from decreasing to increasing at time t2.

At 410, method 400 includes inferring an amount of fuel added to the fuel tank based on the cool down time duration. For example, as shown in graph 606, the cool down duration may be proportional to the amount of fuel dispensed into the fuel tank. For example, increasing an amount of fuel added to the fuel tank may cause the cool down duration to increase as illustrated in table 602 which shows an example correlation between the cool down time duration and the number of gallons of fuel added to the fuel tank. In some examples, a regression model, e.g., a linear fit 608 of data, may be used to determine the amount of fuel added to the fuel tank based on the length of the cool down time duration.

Figure 7:
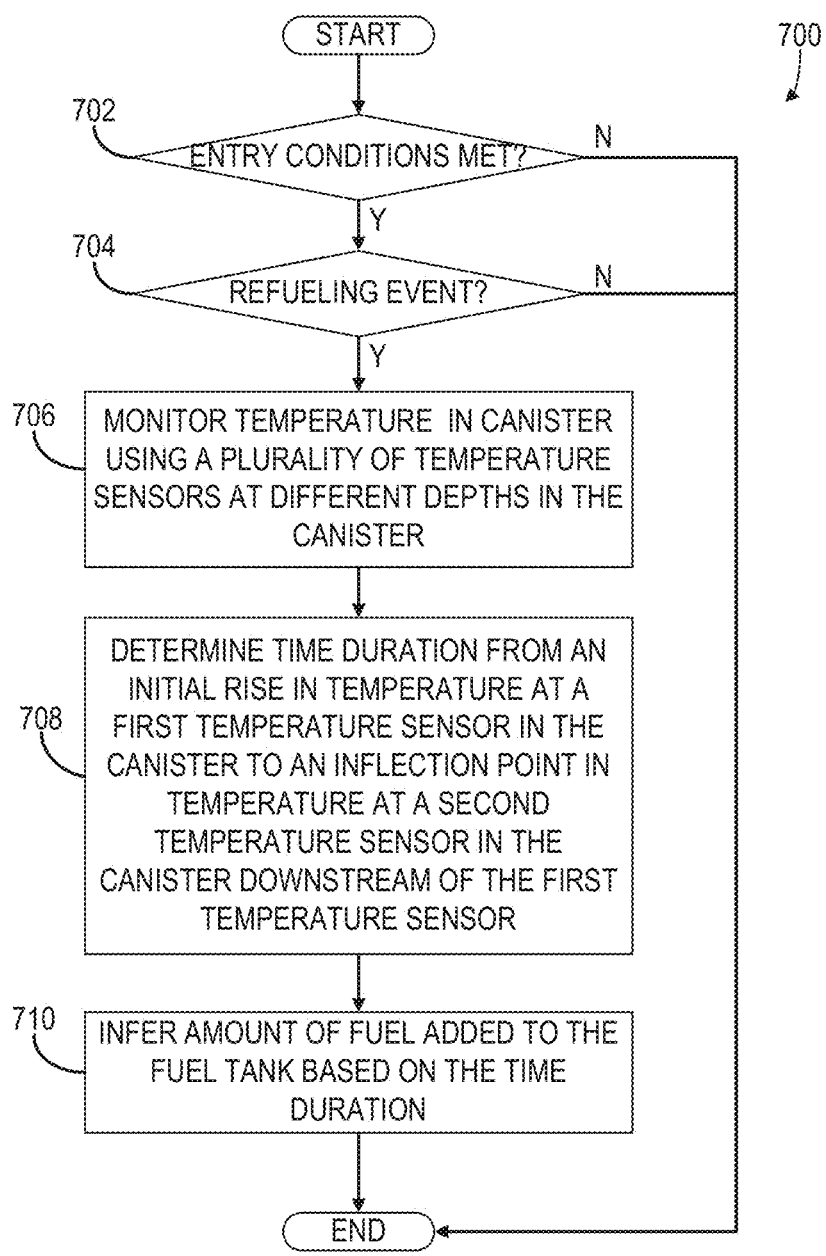
FIG. 7 shows an example method for inferring a fuel level in a fuel tank using a plurality of temperature sensors in a carbon canister.
Figure 8:
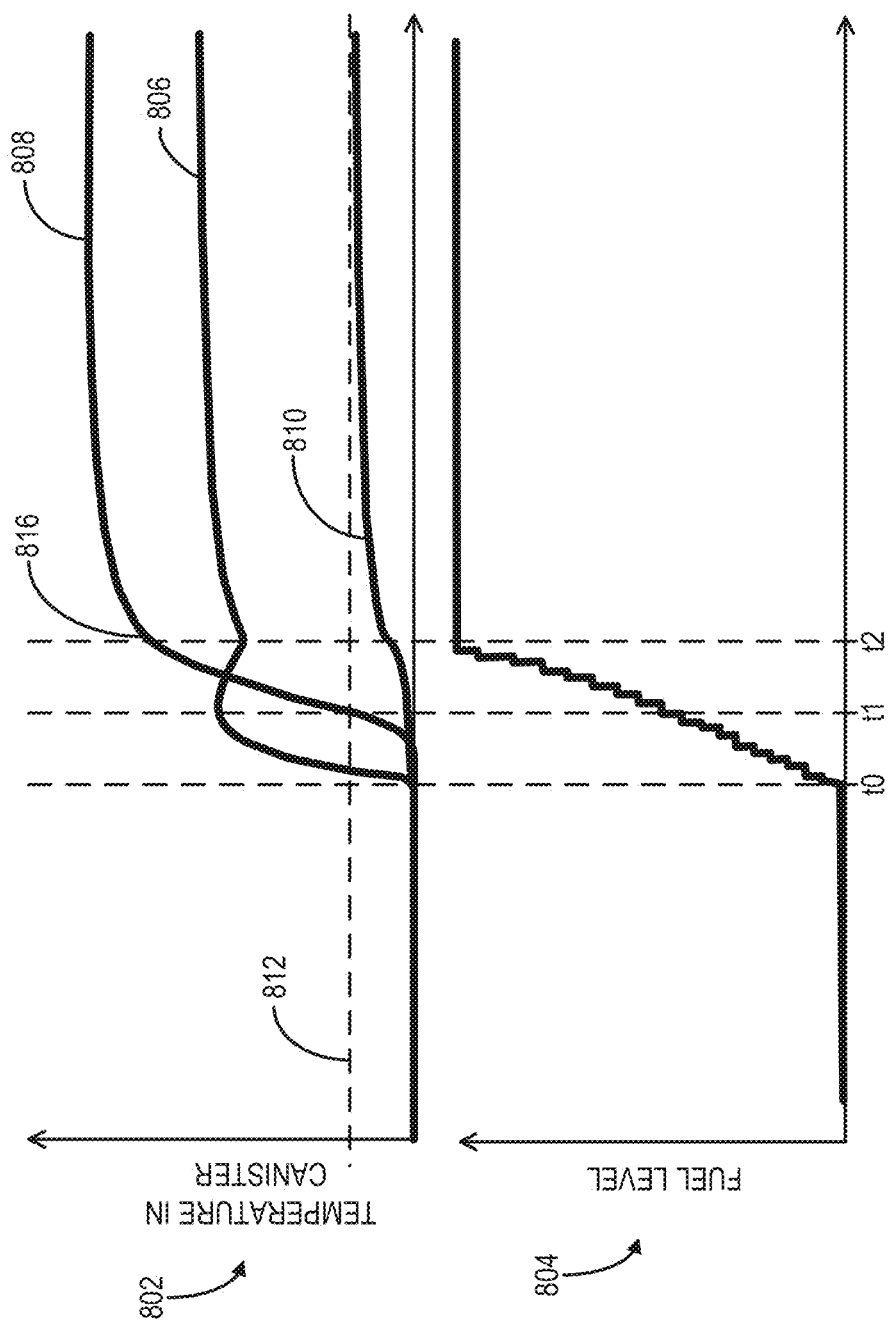
FIGS. 8 and 9 illustrate example temperature changes based on a plurality of temperature sensors in a carbon canister used to infer a fuel level in a fuel tank.
Figure 9:
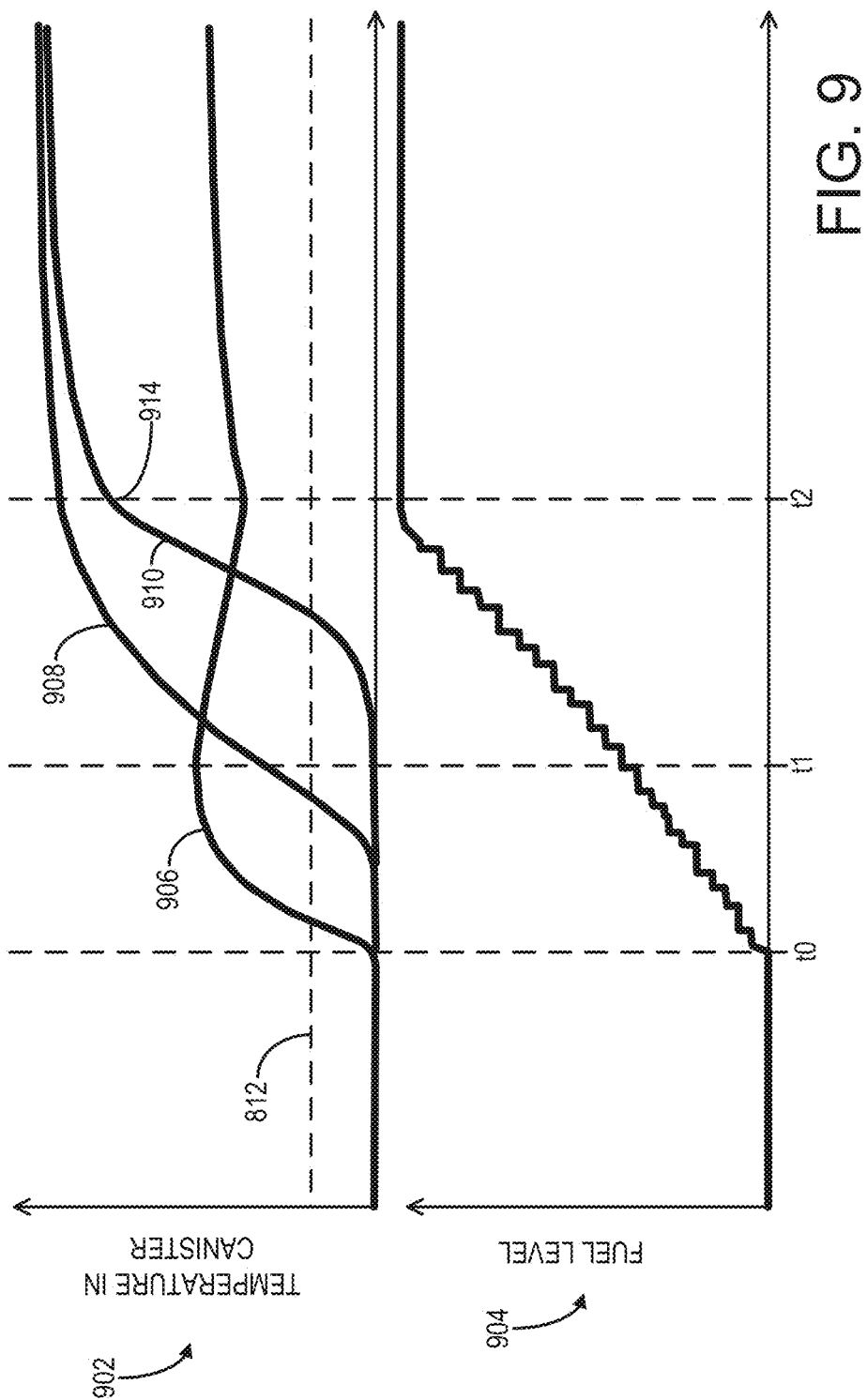
Figure 10:
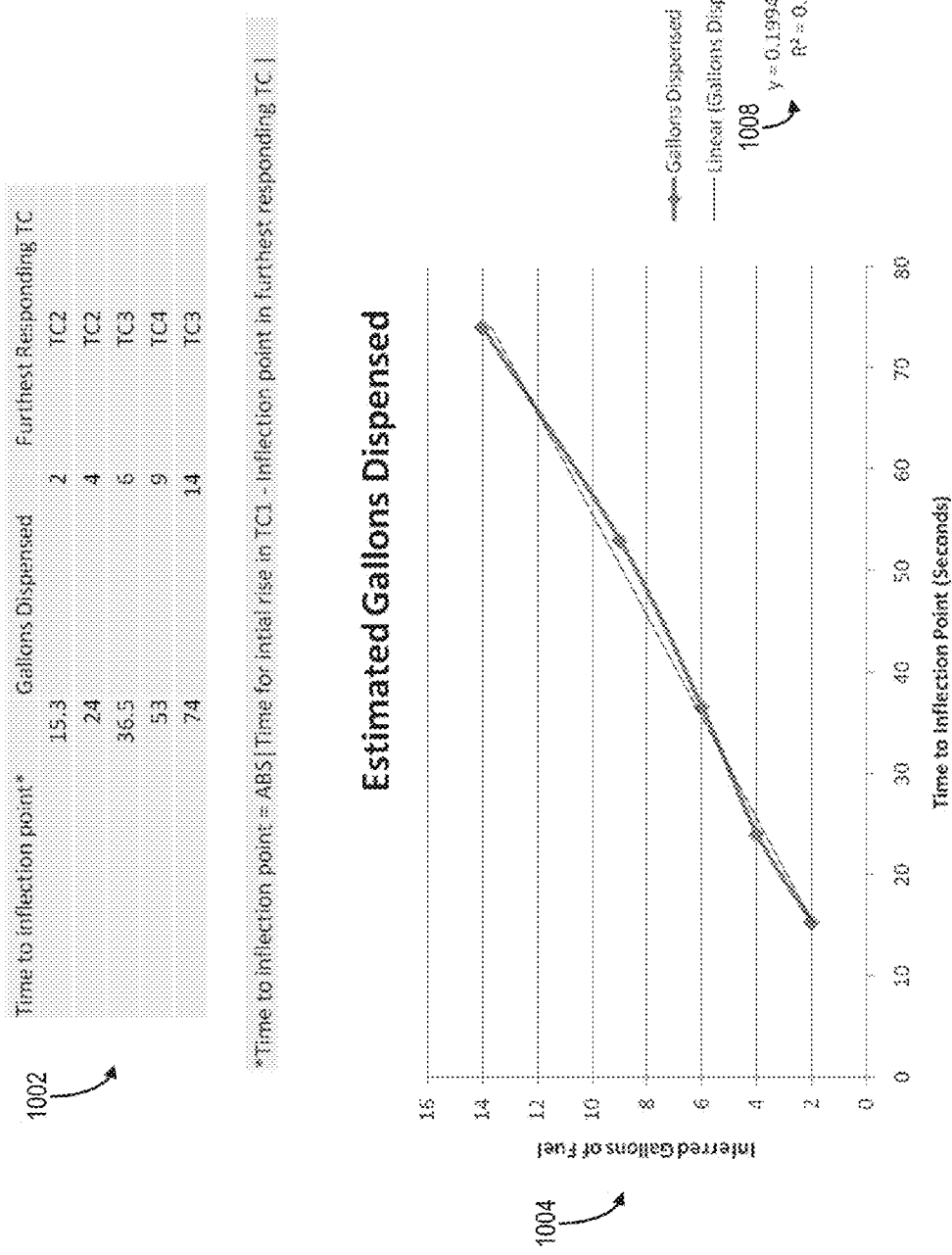
FIG. 10 shows an example graph and corresponding data illustrating a relationship between a time to a temperature inflection point in a carbon canister and an amount of fuel added to a fuel tank during refueling.

FIG. 7 shows an example method 700 for inferring a fuel level in a fuel tank using a plurality of temperature sensors in a carbon canister. As remarked above, by using a plurality of temperature sensors in the carbon canister at different depths in the canister, e.g., temperature sensors TC1, TC2, TC3, TC4, TC5, and TC6 shown in FIG. 2, fuel level may be inferred during a refueling event based on temperature changes in the canister by accounting for an amount of fuel vapor stored in the canister prior to the refueling event. FIGS. 8-10 illustrate example method 700 and will be described concurrently with FIG. 7.

FIG. 8 shows example temperature responses when the canister has a first amount of initial loading, e.g., a first amount of fuel vapor stored in the canister when the refueling event begins. In particular at 802, FIG. 8 shows temperature changes in the canister as measured by different temperature sensors in the canister during a refueling event which begins at time t0 with a temperature response 806 from upstream sensor TC1, temperature response 808 from sensor TC2 which is downstream of TC1, and temperature response 810 from sensor TC3 which is downstream of TC2. Graph 804 in FIG. 8 shows fuel level in the fuel tank, e.g., tank 120, during the refueling event.

FIG. 9 shows example temperature responses when the canister has a second amount of initial loading greater than the first amount of loading shown in FIG. 8. In particular at 902, FIG. 9 shows temperature changes in the canister as measured by different temperature sensors in the canister during a refueling event which begins at time t0 with a temperature response 906 from upstream sensor TC1, temperature response 908 from sensor TC2 which is downstream of TC1, and temperature response 910 from sensor TC3 which is downstream of TC2. Graph 904 in FIG. 9 shows fuel level in the fuel tank, e.g., tank 120, during the refueling event.

FIG. 10 shows an example graph 1004 and corresponding data table 1002 illustrating a relationship between a time to a temperature inflection point in the carbon canister and an amount of fuel added to a fuel tank during the refueling event which may be used to infer an amount of fuel added to the tank during the refueling event.

At 702, method 700 includes determining if entry conditions are met. As described above, entry conditions may include engine-off conditions and conditions where fuel level sensor operation is degraded. If entry conditions are met at 702, method 700 proceeds to 704. At 704, method 700 included determining if a refueling event occurs. If a refueling event occurs at 704, method 700 proceeds to 706.

At 706, method 700 includes monitoring temperatures in the canister using a plurality of temperature sensors at different depths in the canister. For example, temperature sensors TC1, TC2, TC3, TC4, TC5, and TC6 may be used to monitor temperature changes in the canister during the refueling event. The temperature responses from the sensors at various depths in the canister may depend on the amount of initial loading of fuel vapors in the canister when the refueling event begins. For example, the load side of the canister may experience an immediate heat gain when refueling begins so that a temperature increase is measured by the upstream sensor TC1 when the refueling event begins. As more fuel is dispensed, deeper regions in the canister may experience heat gain. By monitoring the various temperature sensors inside the canister for changes in temperature, the amount of fuel dispensed can be inferred. A time duration from the instant that temperature as measured by load side sensor TC1 starts to increase to the instant that a temperature inflection point is measured by the most downstream temperature sensor may be used to infer the amount of fuel added to the fuel tank during the refueling event. The initial loading of the canister may affect how far downstream temperature sensors will react. For example, a 50% loaded canister and a full refuel may cause sensors TC3, TC4 and TC5 to react. An empty canister and a full refuel may not cause the downstream sensors TC4 and TC5 to react.

For example, as shown in FIG. 8 which illustrates a refueling event with a first amount of initial loading in the canister, the temperature response 806 of the upstream sensor TC1 begins to increase at time t0 when the refueling event begins. After time t0, as fuel vapors begin to become adsorbed by adsorbent adjacent to sensor TC2 downstream of sensor TC1, the temperature as measured by sensor TC2 begins to increase as indicated by temperature response 816. Following the response of TC2, the sensor TC3 which is downstream of sensor TC2 may begin to respond so that a temperature increase may be measured by TC3 as indicated by temperature response 810. However, in this example, the temperature response 810 of downstream sensor TC3 may be less than a predetermined threshold 812 so that the response of sensor TC3 may not be taken into account for inferring fuel level. For example, since the temperature response 810 of sensor TC3 is less than threshold 812, it may be determined that temperature sensor TC2 is the most downstream responding temperature sensor so that the time duration from an initial rise in temperature at the first temperature sensor TC1 at time t0 to an inflection point 816 in temperature at sensor TC2 at time t2 is used to infer fuel level As another example, as shown in FIG. 9 which illustrates a refueling event with a second amount of initial loading in the canister greater than the first amount of initial loading illustrated in FIG. 8, the temperature response 906 of the upstream sensor TC1 begins to increase at time t0 when the refueling event begins. After time t0, as fuel vapors begin to become adsorbed by adsorbent adjacent to sensor TC2 downstream of sensor TC1, the temperature as measured by sensor TC2 begins to increase as indicated by temperature response 916. Following the response of TC2, the sensor TC3 which is downstream of sensor TC2 may begin to respond so that a temperature increase may be measured by TC3 as indicated by temperature response 910. In this example, the temperature response 910 of downstream sensor TC3 is greater than the predetermined threshold 812, thus it may be determined that temperature sensor TC3 is the most downstream responding temperature sensor so that the time duration from an initial rise in temperature at the first temperature sensor TC1 at time t0 to an inflection point 914 in temperature at sensor TC3 at time t2 is used to infer fuel level At 708, method 700 includes determining the time duration from the initial rise in temperature at a first temperature sensor in the canister to an inflection point in temperature at a second temperature sensor in the canister downstream of the first temperature sensor. The second temperature sensor is the most downstream temperature sensor in the canister to respond by more than a predetermined amount. As remarked above, this time duration may depend on an initial loading of the canister. For example, as shown in FIG. 8 when the canister has a first amount of initial loading, the time duration may begin at time t0 when temperatures measured by TC1 begin to increase and end at time t2 at inflection point 816 in temperature measured by TC2. As another example, as shown in FIG. 8 when the canister has a second amount of initial loading greater than the first amount of loading, the time duration may begin at time t0 when temperatures measured by TC1 begin to increase and end at time t2 at inflection point 914 in temperature measured by TC3.

At 710, method 700 includes inferring an amount of fuel added to the fuel tank based on the time duration determined at 708. For example, as shown in graph 1004, the time to the inflection point in the most downstream responding temperature sensor may be proportional to the amount of fuel dispensed into the fuel tank. For example, increasing an amount of fuel added to the fuel tank may cause farther downstream temperature sensors to respond so that the time to the inflection point increases as illustrated in table 1002. In particular, table 1002 shows an example correlation between the time to the inflection point, the furthest responding temperature sensor, and the number of gallons of fuel added to the fuel tank. In some examples, a regression model, e.g., a linear fit 1008 of data, may be used to determine the amount of fuel added to the fuel tank based on the length of the time to the inflection point measured by the most downstream responding temperature sensor.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine with an evaporative emission control system, comprising:
 indicating an amount of fuel added to a fuel tank during a refueling event based on a time duration of a temperature change of adsorbent in a carbon canister during the refueling event, wherein the temperature change is based on a plurality of temperature sensors coupled to the carbon canister at various depths.

2. The method of claim 1, further comprising, in response to the indicated amount of fuel added to the fuel tank during the refueling event being substantially equal to a maximum fuel level of the fuel tank, indicating a fuel level in the fuel tank based on a difference between the amount of fuel added to the fuel tank and an amount of fuel delivered to fuel injectors.

3. The method of claim 1, wherein the time duration of the temperature change is from an initial temperature increase in the canister until an inflection point in temperature in the canister.

4. The method of claim 1, wherein the time duration is from an initial rise in temperature at a first temperature sensor in the canister to an inflection point in temperature at a second temperature sensor in the canister downstream of the first temperature sensor.

5. The method of claim 4, wherein the second temperature sensor is a most downstream temperature sensor in the canister to respond by more than a predetermined amount.

6. A method for an engine with an evaporative emission control system, comprising:
 indicating an amount of fuel added to a fuel tank during refueling based on a time duration of a temperature change during refueling from an initial temperature change in a carbon canister until an inflection point in temperature in the canister; and
 indicating an instantaneous fuel level based on a difference between the amount of fuel added to the fuel tank and an amount of fuel delivered to fuel injectors.

7. The method of claim 6, wherein the temperature change is measured via a single temperature sensor coupled to the canister and wherein the time duration is from an initial temperature decrease in the canister during refueling until the inflection point where the temperature in the canister switches from decreasing to increasing.

8. The method of claim 6, wherein the temperature change is based on a plurality of temperature sensors coupled to the carbon canister at various depths and wherein the time duration is from an initial rise in temperature at a first temperature sensor in the canister to an inflection point in temperature at a second temperature sensor in the canister downstream of the first temperature sensor, wherein the second temperature sensor is a most downstream temperature sensor in the canister to respond by more than a predetermined amount.

9. A method for an engine with an evaporative emission control system, comprising:
 indicating an amount of fuel added to a fuel tank during a refueling event based on a time duration of a temperature change of adsorbent in a carbon canister during the refueling event, wherein the time duration of the temperature change is from an initial temperature increase in the canister until an inflection point in temperature in the canister.

10. A method for an engine with an evaporative emission control system, comprising:
 indicating an amount of fuel added to a fuel tank during a refueling event based on a time duration of a temperature change of adsorbent in a carbon canister during the refueling event, wherein the time duration is a cool down duration based on a single temperature sensor coupled to the canister.

11. The method of claim 10, wherein the cool down duration is a time duration from an initial temperature decrease in the canister during refueling until an inflection point where a temperature in the canister switches from decreasing to increasing.

* * * * *